Figure 1:
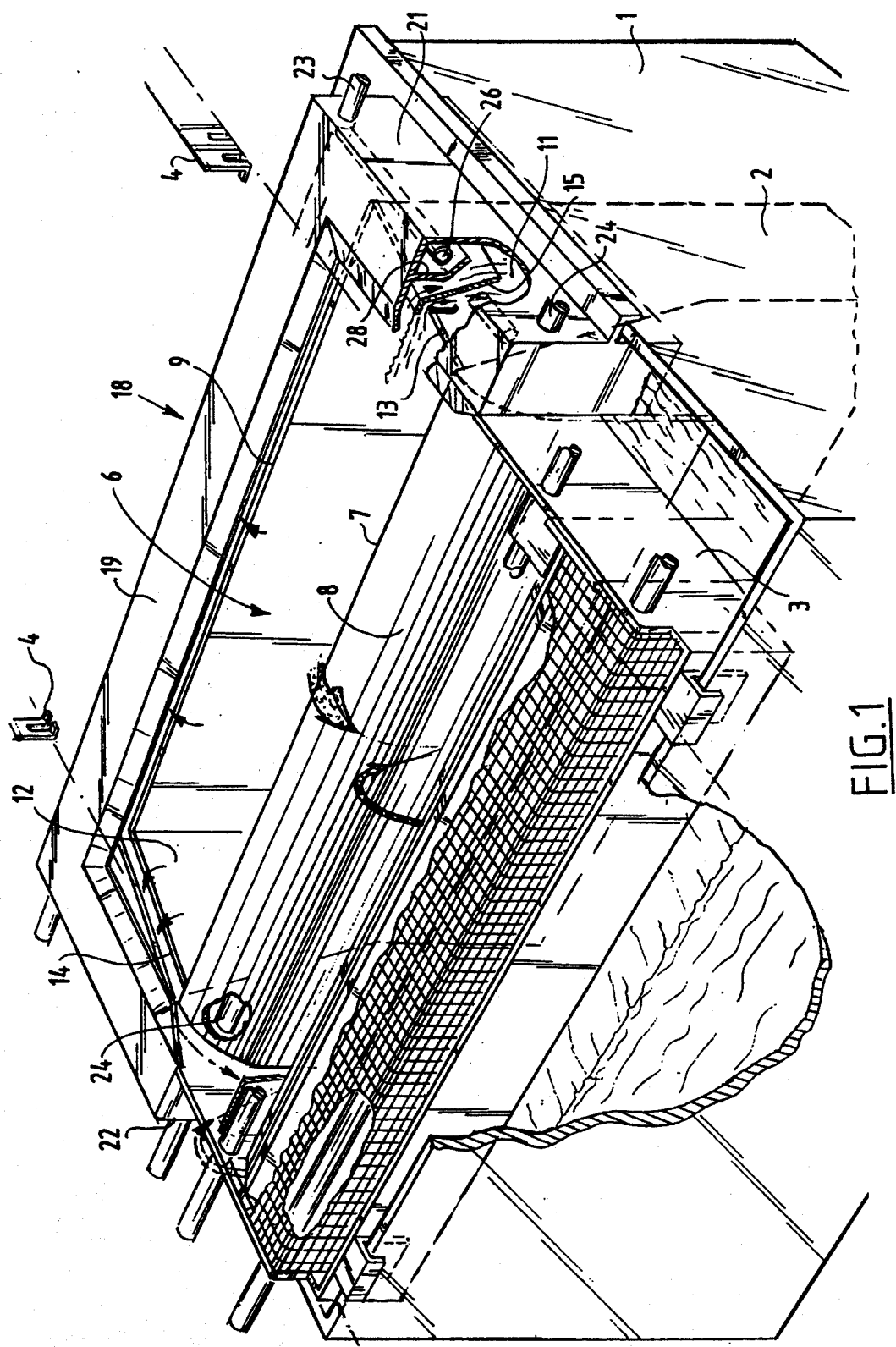

United States Patent [19]

Hendrikx

[11] Patent Number: 5,419,482

[45] Date of Patent: May 30, 1995

[54] SOLDERING APPARATUS WITH ADAPTED SOLDERING TOWER

[75] Inventor: Adrianus J. M. Hendrikx, Etten-Leur, Netherlands

[73] Assignee: Soltec B.V., Oosterhout, Netherlands

[21] Appl. No.: 175,518

[22] Filed: Dec. 30, 1993

[30] Foreign Application Priority Data

Nov. 8, 1993 [NL] Netherlands .......................... 9301935

[51] Int. Cl.6 ............................ B23K 3/06; B23K 1/08
[52] U.S. Cl. ..................................... 228/37; 228/260; 118/410
[58] Field of Search .................... 228/37, 260, 56.1, 42; 118/410

[56] References Cited

U.S. PATENT DOCUMENTS

| | | | |
|---|---|---|---|
| 3,612,388 | 10/1971 | Wegener et al. | 228/37 |
| 4,465,219 | 8/1984 | Kondo | 228/37 |
| 4,821,947 | 4/1989 | Nowotarski | 228/37 |
| 5,240,169 | 8/1993 | Gileta | 228/37 |

FOREIGN PATENT DOCUMENTS

| | | |
|---|---|---|
| 0292079 | 11/1988 | European Pat. Off. . |
| 0500135 | 8/1992 | European Pat. Off. . |
| 57-142766 | 9/1982 | Japan ..................................... 228/37 |
| 3-238167 | 10/1991 | Japan ..................................... 228/37 |

Primary Examiner—P. Austin Bradley
Assistant Examiner—Jeffrey T. Knapp
Attorney, Agent, or Firm—Banner, Birch, McKie & Beckett

[57] ABSTRACT

The invention relates to a soldering apparatus comprising: a vessel for liquid solder; at least one soldering tower placed in the vessel for causing liquid solder to leave the soldering tower on the upper side, wherein the soldering tower is adapted to cause the liquid solder to run off on all sides; a conveyor for carrying objects for soldering along the top side of the soldering tower such that the objects for soldering come into contact with the liquid solder; and a cover for maintaining an atmosphere with a reduced oxygen content at least in the surrounding area of the liquid solder.

5 Claims, 2 Drawing Sheets

SOLDERING APPARATUS WITH ADAPTED SOLDERING TOWER

The invention relates to a soldering apparatus comprising: a vessel for liquid solder; at least one soldering tower placed in the vessel for causing liquid solder to leave the soldering tower on the upper side, wherein the soldering tower is adapted to cause the liquid solder to run off on at least one side; transporting means for carrying objects for soldering along the top side of the soldering tower such that the objects for soldering come into contact with the liquid solder; means for maintaining an atmosphere with a reduced oxygen content at least in the surrounding area of the liquid solder.

Such a soldering apparatus is known from NL-9101383.

In this known soldering apparatus the liquid solder flows downward from the top side of the soldering tower to the front and rear sides over a front respectively rear overflow edge as seen in the conveying direction of the transporting device. There are therefore two separate solder flows. Each of these solder flows is bounded on either side by stationary edge guide means which slow down the flow in the surrounding area. This has the result that in the vicinity of the edge guide means the liquid solder is transported for a longer time and has a greater chance of coming into contact with the oxygen.

It is noted here that although the environment substantially excludes oxygen, not all oxygen is removed. The possibility therefore still exists of the liquid solder coming into contact with oxygen and of oxides being formed as a result.

The object of the present invention is to avoid the above stated problem.

This object is achieved in that the soldering tower is adapted to cause the liquid solder to run off on all sides.

These steps have the result that the flow speed of the liquid solder is not slowed, so that the liquid solder is in contact with the surrounding area for the shortest possible time, whereby the formation of oxides is avoided as far as possible and those oxides which do form can flow away immediately.

Figure 2:
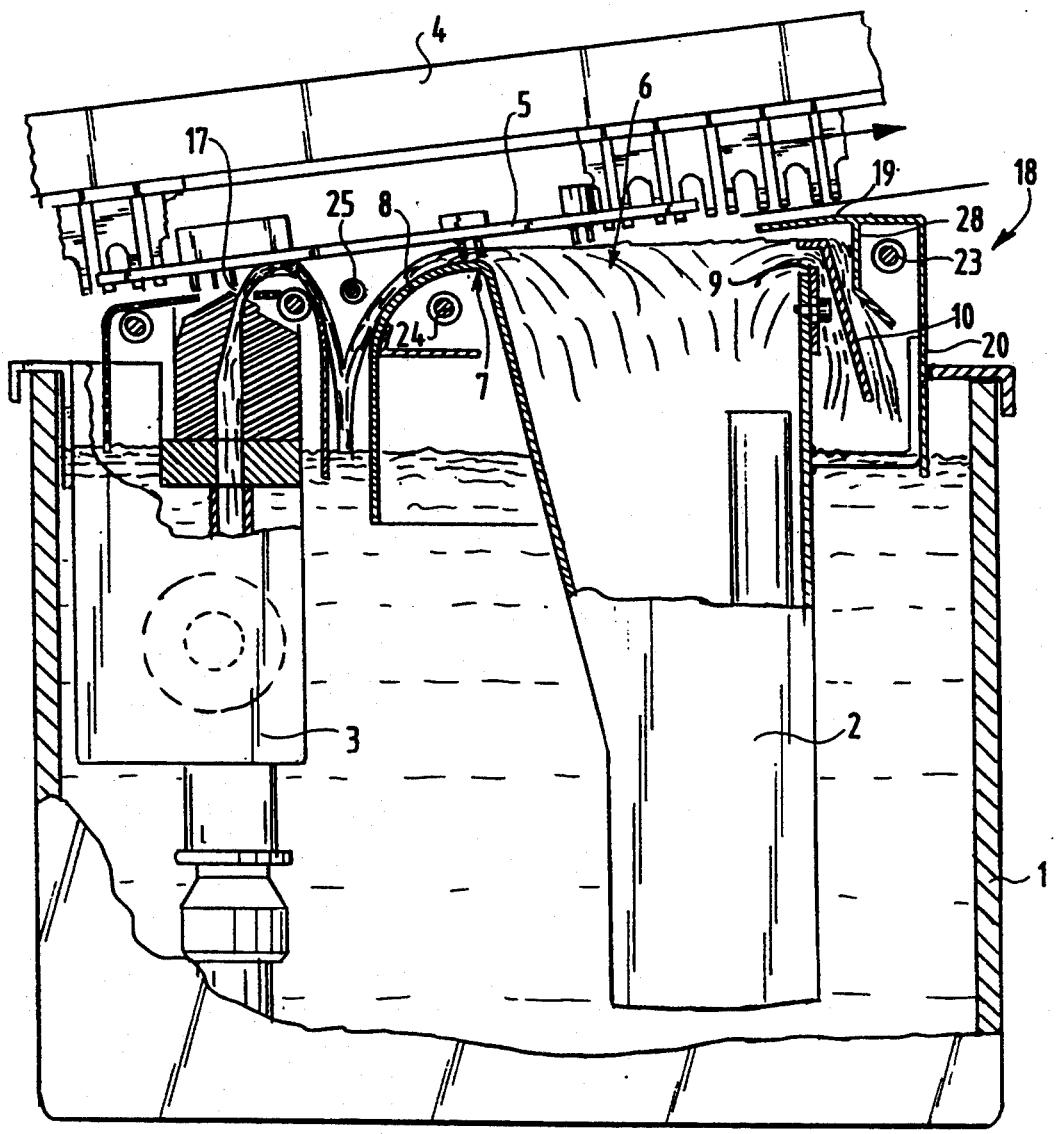

The present invention will subsequently be elucidated with reference to the annexed drawings, in which:

FIG. 1 shows a partly broken away perspective view of a soldering tower placed in a soldering vessel and provided with steps according to the invention; and FIG. 2 shows a sectional view of the soldering tower depicted in FIG. 1.

The soldering apparatus according to the present invention comprises a soldering vessel 1 in which are placed a first soldering tower 2 and a second soldering tower 3. Extending above the vessel is a transporting device 4 which is adapted to transport objects for soldering 5.

The first soldering tower 2 is provided on its top side with an outflow opening 6 out of which flows liquid solder.

On the first side as seen in the conveying direction of the transporting device the first soldering tower is provided with an overflow edge 7 which transposes into a guide plate 8 extending obliquely downward for the liquid solder flowing over the overflow edge 7. On the opposite side the first soldering tower 2 is provided with an overflow edge 9, at a distance from which is arranged a guide plate 10 extending obliquely downward.

The first soldering tower 2 is of course provided with side walls 11, 12 which form overflow edges 13, 14 on their upper side.

Arranged connecting once again onto each of the overflow edges are the respective guide plates 15, 16 which extend obliquely downward.

The second soldering tower 3, which is otherwise placed before the first soldering tower as seen in the conveying direction of the transporting device, comprises only a single narrow outflow opening 17 from which the liquid solder comes out with a pressure such that the liquid solder leaves the outflow opening substantially upward.

In this case there are no overflow edges or guide plates.

Arranged above the first soldering tower is a cover 18 which serves as boundary for the atmosphere substantially excluding oxygen. The cover has a substantially U-shape and extends to the rear and both sides of the soldering tower. The cover further has a substantially L-shaped section. The cover thus comprises a substantially U-shaped top plate 19, a downward extending rear wall 20 and two downward extending side walls 21 and 22.

Arranged under the cover are feed members for feeding gas substantially excluding oxygen in the form of gas-permeable pipes 23, 24, 25 and 26. The pipes 23, 26 and 27 are herein situated between the cover and a substantially downward extending skirting plate 28 arranged on the inside of the cover.

The second soldering tower is otherwise provided with means known from the prior art for maintaining an atmosphere substantially excluding oxygen in the surrounding area of the solder wave leaving the second soldering tower.

During operation of the first soldering tower the liquid solder leaving the tower will run off on all four sides of soldering tower 2, over the overflow edges 7, 9, 13 and 14, and along the plates 8, 10, 15 and 16 with the positive consequences stated in the introduction for limiting the formation of dross and oxides.

I claim:

1. Soldering apparatus comprising:
   a vessel for liquid solder;
   at least one soldering tower placed in the vessel for causing liquid solder to leave the soldering tower on the upper side;
   transporting means for carrying objects for soldering along the top side of the soldering tower such that the objects for soldering come into contact with the liquid solder;
   means for maintaining an atmosphere with a reduced oxygen content at least in the surrounding area of the liquid solder;
   wherein the soldering tower has a rectangular cross section,
   characterized in that the soldering tower is adapted to cause the liquid solder to run off on all sides by having overflow edges at all four sides.

2. Soldering apparatus as claimed in claim 1, characterized in that the soldering tower is provided on all four sides with run-off plates extending obliquely downward.

3. Soldering apparatus as claimed in claim 2, characterized in that the soldering tower is provided on at least one side with a cover retaining the atmosphere substantially excluding oxygen.

4. Soldering apparatus as claimed in claim 1, characterized in that the soldering tower is provided on at least one side with a cover retaining the atmosphere substantially excluding oxygen.

5. Soldering apparatus as claimed in claim 4, characterized in that the cover extends along three sides of the soldering tower.

* * * * *